US008823536B2

(12) United States Patent
Avner et al.

(10) Patent No.: US 8,823,536 B2
(45) Date of Patent: Sep. 2, 2014

(54) AUTOMATED RECOVERY AND ESCALATION IN COMPLEX DISTRIBUTED APPLICATIONS

(75) Inventors: Jon Avner, Redmond, WA (US); Shane Brady, Seattle, WA (US); Wing Man Yim, Bellevue, WA (US); Haruya Shida, Redmond, WA (US); Selim Yazicioglu, Redmond, WA (US); Andrey Lukyanov, Redmond, WA (US); Brent Alinger, Snoqualmie, WA (US); Colin Nash, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 12/764,263

(22) Filed: Apr. 21, 2010

(65) Prior Publication Data

US 2011/0260879 A1 Oct. 27, 2011

(51) Int. Cl.
*G08B 21/00* (2006.01)
*G06F 15/16* (2006.01)

(52) U.S. Cl.
USPC .......................... 340/679; 709/205; 709/204

(58) Field of Classification Search
USPC .......................................... 340/679; 709/205
See application file for complete search history.

(56) References Cited

U.S. PATENT DOCUMENTS

| 6,918,059 | B1 | 7/2005 | Galuten et al. |
| 6,999,990 | B1 | 2/2006 | Sullivan et al. |
| 7,243,124 | B1 | 7/2007 | Gardner et al. |
| 7,376,969 | B1 * | 5/2008 | Njemanze et al. ............. 726/22 |
| 7,401,265 | B2 | 7/2008 | Bae et al. |
| 7,490,073 | B1 | 2/2009 | Qureshi et al. |
| 2002/0016871 | A1 | 2/2002 | Graf |
| 2004/0267679 | A1 * | 12/2004 | Fromherz et al. ............... 706/19 |
| 2005/0015678 | A1 | 1/2005 | Miller |
| 2006/0064486 | A1 * | 3/2006 | Baron et al. .................. 709/224 |
| 2008/0281607 | A1 * | 11/2008 | Sajja et al. ........................ 705/1 |
| 2009/0063509 | A1 * | 3/2009 | Lockhart et al. ................ 707/10 |
| 2010/0070800 | A1 * | 3/2010 | Hanna .............................. 714/6 |
| 2011/0099420 | A1 * | 4/2011 | MacDonald McAlister et al. ........................... 714/6.32 |

FOREIGN PATENT DOCUMENTS

EP 1630710 A2 3/2006

OTHER PUBLICATIONS

Chen, et al., "Failure Detection in Large-Scale Internet Services by Principal Subspace Mapping", Retrieved at << http://ieeexplore.ieee.org/stamp/stamp.jsp?tp=&arnumber=4302740 >>, IEEE Transactions on Knowledge and Data Engineering, vol. 19, No. 10, Oct. 2007, pp. 1308-1320.
"SysUpTime MSP (Distributed) Edition", Retrieved at << http://www.ireasoning.com/network_monitor.shtml >>, Retrieved Date: Feb. 20, 2010, pp. 3.
"Service Availability Management (SAM) Pack", Retrieved at << http://supportconnectw.ca.com/public/impcd/r11/Unicenter/SAMP.htm >>, May 9, 2008, pp. 9.

(Continued)

*Primary Examiner* — Jack K Wang
(74) *Attorney, Agent, or Firm* — Louise Bowman; Jim Ross; Micky Minhas

(57) ABSTRACT

Alerts based on detected hardware and/or software problems in a complex distributed application environment are mapped to recovery actions for automatically resolving problems. Non-mapped alerts are escalated to designated individuals or teams through a cyclical escalation method that includes a confirmation hand-off notice from the designated individual or team. Information collected for each alert as well as solutions through the escalation process may be recorded for expanding the automated resolution knowledge base.

20 Claims, 6 Drawing Sheets

(56) References Cited

OTHER PUBLICATIONS

Goldszmidt, et al., "Toward Automatic Policy Refinement in Repair Services for Large Distributed Systems", Retrieved at << http://research.microsoft.com/pubs/102707/policy.pdf >>, In The 3rd ACM SIGOPS International Workshop on Large Scale Distributed Systems and Middleware, Sep. 17, 2009, pp. 1-5.

Hoffman, Bill., "Monitoring, at Your Service", Retrieved at << http://delivery.acm.org/10.1145/1120000/1113335/p34-hoffman.pdf?key1=1113335&key2=0386466621&coll=GUIDE&dl=GUIDE&CFID=78682583&CFTOKEN=24207491 >>, Queue, Managing Megaservices, vol. 3, No. 10, Dec. 2005, pp. 34-43.

"International Search Report", Mailed Date: Dec. 27, 2011, Application No. PCT/US2011/030458, Filed Date: Mar. 30, 2011, pp. 9.

\* cited by examiner

AUTOMATED RECOVERY AND ESCALATION IN COMPLEX DISTRIBUTED APPLICATIONS

BACKGROUND

In today's networked communication environments many services that used to be provided by locally executed applications are provided through distributed services. For example, email services, calendar/scheduling services, and comparable ones are provided through complex networked systems that involve a number of physical and virtual servers, storage facilities, and other components across geographical boundaries. Even organizational systems such as enterprise networks may be implemented through physically separate server farms, etc.

While distributed services make it easier to manage installation, update, and maintenance of applications (i.e., instead of installing, updating, and maintaining hundreds, if not thousands of local applications, a centrally managed service may take care of these tasks), such services still involve a number of applications executed on multiple servers. When managing such large scale distributed applications continuously, a variety of problems are to be expected. Hardware failures, software problems, and other unexpected glitches may occur regularly. Attempting to manage and recover from such problems manually may require a cost prohibitive number of dedicated and domain knowledgeable operations engineers.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to mapping detected alerts to recovery actions for automatically resolving problems in a networked communication environment. Non-mapped alerts may be escalated to designated individuals through a cyclical escalation method that includes a confirmation hand-off notice from the designated individual. According to some embodiments, information collected for each alert as well as solutions through the escalation process may be recorded for expanding the automated resolution knowledge base.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
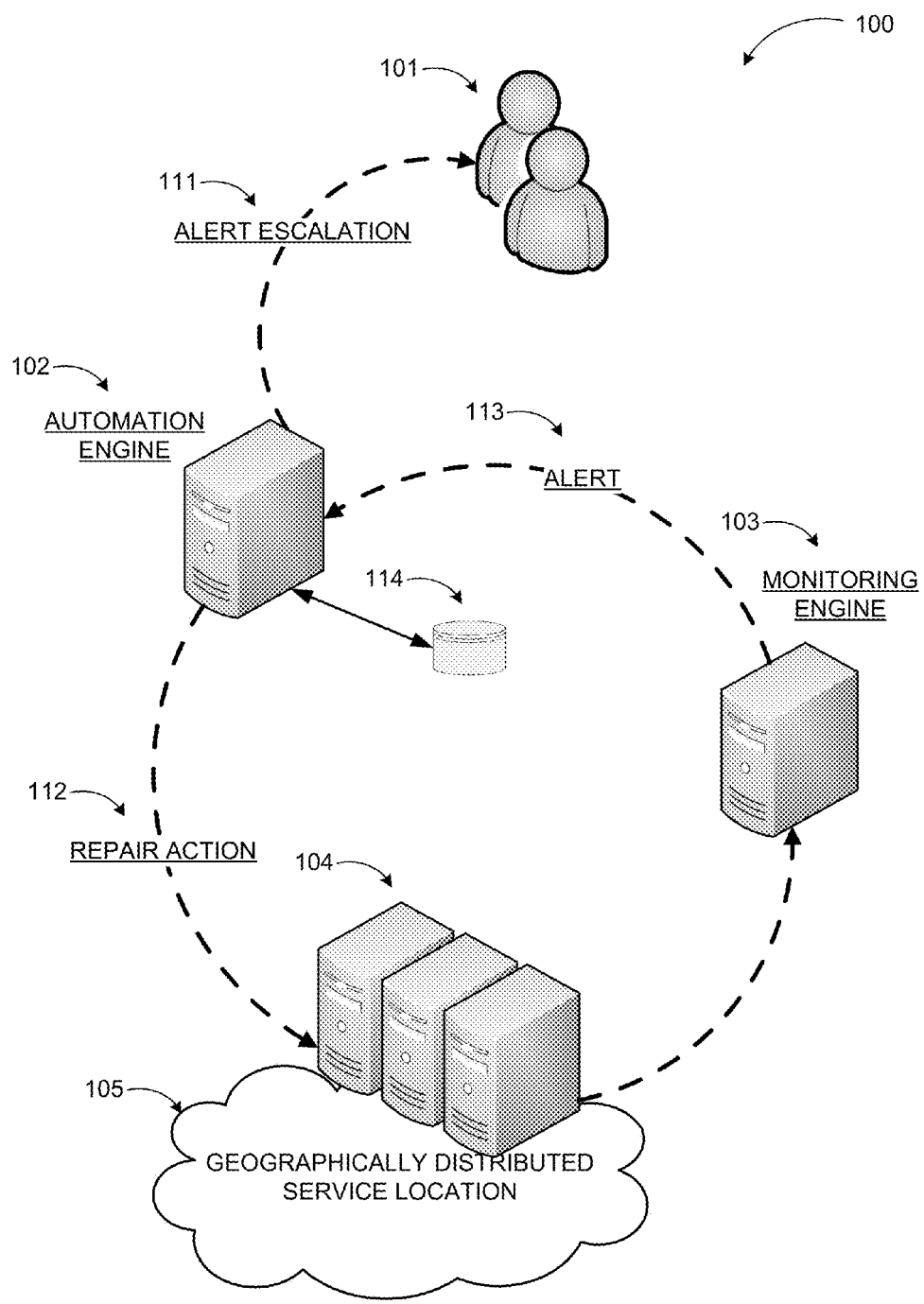
FIG. 1 is a conceptual diagram illustrating an example environment where detection of an alert may lead to a repair action or the escalation of the alert.

As briefly described above, alerts in a networked system may be managed through an automated action/escalation process that utilizes actions mapped to alerts and/or escalations for manual resolution while expanding a knowledge base for the automated action portion and providing collected information to designated individuals tasked with addressing the problems. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, references are made to services. A service as used herein describes any networked/on line application(s) that may receive an alert as part of its regular operations and process/store/forward that information. Such application(s) may be executed on a single computing device, on multiple computing devices in a distributed manner, and so on. Embodiments may also be implemented in a hosted service executed over a plurality of servers or comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 illustrates an example environment where detection of an alert may lead to a repair action or escalation of the alert. As briefly mentioned before, embodiments address complexity of technical support services by automation of the repair actions and the escalation of alerts. For example, in a distributed technical support services system, monitoring engine 103 may send an alert 113 to an automation engine 102 upon detecting a hardware, software, or hardware/software combination problem in the distributed system. Automation engine 102 may attempt to map the alert 113 to a repair action 112. If the automation engine 102 successfully maps the alert 113 to the repair action 112, then the automation engine 102 may execute the repair action 112, which may include a set of instructions to address the detected problem.

The problem may be associated with one or more devices 104 in the geographically distributed service location 105. The devices may include any computing device such as a desktop computer, a server, a smart phone, a laptop computer, and comparable ones. Devices 104 may further include additional remotely accessible devices such as monitors, audio equipment, television sets, video capturing devices, and other similar devices.

The alert 113 may include state information of the device or program associated with the detected problem such as the device's memory contents, sensor readings, last executed instructions, and others. The alert 113 may further include a problem description such as which instruction failed to execute, which executions indicate results beyond predefined limits, and similar ones.

The automation engine 102 may attempt to map the alert 113 to a repair action 112 by searching a troubleshoot database 114. The troubleshoot database 114 may store profiles of alerts matched to repair actions further classified by device or software programs. An example implementation may be a communication device's "no connection" alert matched to a repair action of restarting communication device's network interface. One or more repair actions may be mapped to each alert. Furthermore, one or more alerts may be mapped to a single repair action.

If the automation engine 102 determines multiple repair actions for an alert, an execution priority may depend on a predefined priority of the repair actions. For example, a primary repair action in the above discussed scenario may be restart of the network interface followed by a secondary repair action of rebooting the communication device. The predefined priority of repair actions may be manually input into the troubleshoot database 114 or automatically determined based on a repair action success evaluation scheme upon successful correction of the problem.

According to some embodiments, the repair action 112 may include gathering of additional diagnostics information from the device and/or software program associated with the problem. The additional diagnostics information may be transmitted to the monitoring engine as an alert restarting the automated cycle according to other embodiments. In response to an alert, additional diagnostics information may also be collected and stored in the system. The stored information may be used to capture the problem state and provide the context when the alert is escalated to designated person or team (e.g. 101)

If a mapped repair action is not found in the troubleshoot database 114 by the automation engine 102, the alert 113 may be escalated to a designated person or team 101. The designated person or team 101 may be notified even if a mapped action is found and executed for informational purposes. Transmitting the alert 113 to the designated person or team 101 may be determined from a naming convention of the alert 113. The alert naming convention may indicate which support personnel the alert should be escalated to such as a hardware support team, a software support team, and comparable ones. The naming convention schema may also be used for mapping alerts to recovery actions. For example, the alerts may be named in a hierarchical fashion (i.e. system/component/alert name), and recovery actions may be mapped to anywhere from all alerts for a system (system/*) to a special recovery action for a specific alert. According to some embodiments, each specific alert may have a designated team associated with it, although that team may be defaulted to a specific value for an entire component. The determination of which team member to send the alert to may depend on a predetermined mapping algorithm residing within the automation engine for awareness of support team schedules. The predetermined mapping algorithm may be updated manually or automatically by integrated or external scheduling systems.

The automation engine 102 may escalate the alert 113 to a first designated person or team via an email, an instant message, a text message, a page, a voicemail, or similar means. Alerts may be mapped to team names, and a team name mapped to a group of individuals who are on call for predefined intervals (e.g. one day, one week, etc.). Part of the mapping may be used to identify which people are on call for the interval. This way, the alert mappings may be abstracted from individual team members, which may be fluid. The automation engine 102 may then wait for a hand-off notification from the first designated person or team. The hand-off notification may be received by the automation engine 102 in the manner of how the alert was sent or it may be received through other means. If the automation engine 102 does not receive the hand-off notice within a predetermined amount of time, it may escalate the alert 113 to the next designated person or team on the rotation as determined by a predefined mapping algorithm. The automation algorithm may keep escalating the alert to the next designated person or team on the rotation until it receives a hand-off notice.

The monitoring engine 103 may receive a feedback response (e.g. in form of an action) from the device or software program after execution of the repair action 112 passing the response on to the automation engine 102. The automation engine 102 may then update the troubleshoot database 114. Statistical information such as success ratio of the repair actions may be used in altering the repair actions' execution priority. Moreover, feedback response associated with actions performed by a designated person or team may also be recorded in troubleshoot database 114 such that a machine learning algorithm or similar mechanism may be employed to expand the list of actions, map new alerts to existing actions, map existing alerts to new actions, and so on. Automation engine actions and designated person actions may be audited by the system according to some embodiments. The system may maintain a log of who executed a specific action, when and against which device or server. The records may then be used for troubleshooting, tracking changes in the system, and/or developing new automated alert responses.

According to further embodiments, the automation engine 102 may perform a wild card search of the troubleshoot database 114 and determine multiple repair actions in response to a received alert. Execution of single or groups of repair actions may depend on the predetermined priority of the repair actions. Groups of repair actions may also be mapped to groups of alerts. While an alert may match several wildcard mappings, the most specific mapping may actually be applied. For example, alert exchange/transport/queuing may match mapping exchange/*, exchange/transport/*, and exchange/transport/queuing. However, the last one may actually be the true mapping because it is the most specific one.

Figure 2:
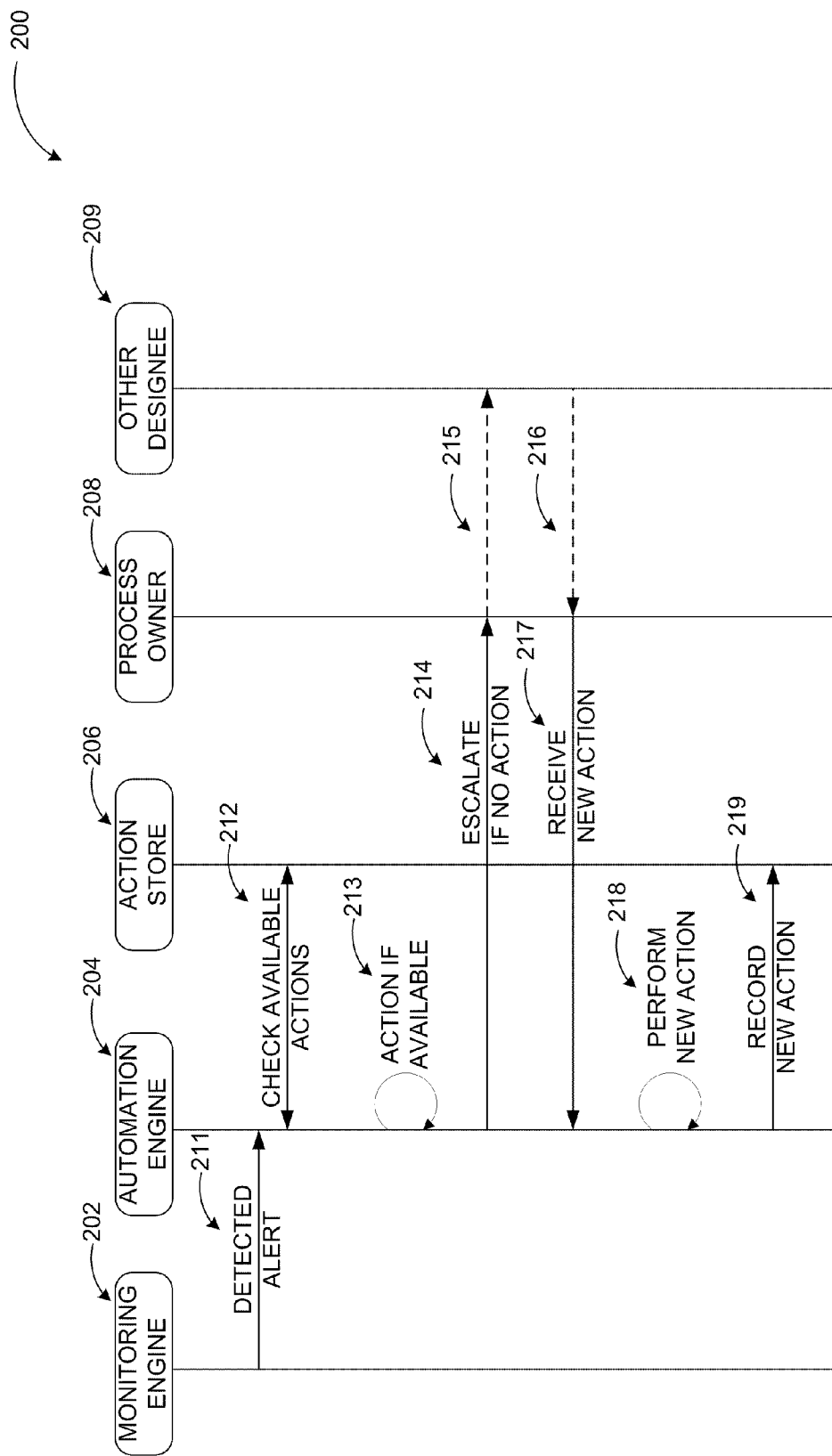
FIG. 2 is an action diagram illustrating actions during the escalation of an alert.

FIG. 2 illustrates actions during the escalation of the alert in diagram 200. Monitoring engine 202 may provide a detected problem as alert (211) to automation engine 204. Automation engine 204 may check available actions (212) from action store 206 (troubleshoot database 114 of FIG. 1) and perform the action if one is available (213). If no action is available, automation engine 204 may escalate the alert (214) to process owner 208. The alert may further be escalated (215) to other designee 209. As discussed previously, the escalation may also be performed in parallel to execution of a determined action.

Upon receiving a new action to be performed (216, 217) from the process owner 208 or other designee 209, automation engine 204 may perform the new action (218) and update records with the new action (219) for future use. The example interactions in diagram 200 illustrate a limited scenario. Other interactions such as hand-offs with the designated persons, feedbacks from devices/software reporting the problem, and similar ones may also be included in operation of an automated recovery and escalation system according to embodiments.

Figure 3:
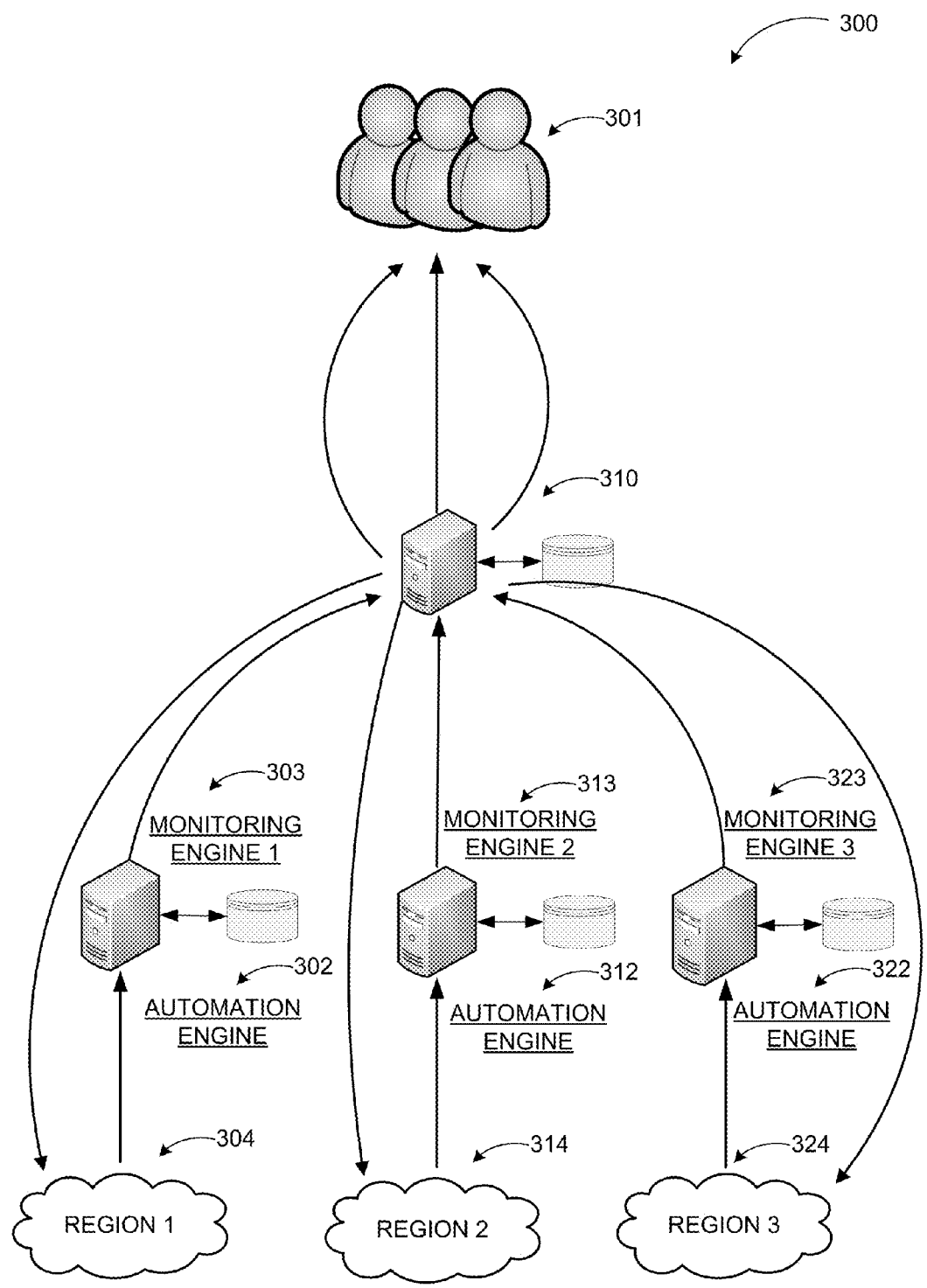
FIG. 3 is another conceptual diagram illustrating alert management in a multi-region environment.

FIG. 3 is a conceptual diagram illustrating alert management in a multi-region environment in diagram 300. In a distributed system, escalation of the alerts may depend on a predetermined priority of the geographical regions. For example, a predetermined priority may escalate an alert from a region where it is daytime and hold an alert from a region where it is nighttime when the escalations are managed by a single support team for both regions. Similarly, repair actions from different regions may be prioritized based on a predetermined priority when the repair actions from the different regions compete for the same hardware, software, communication resources to address the detected problems.

Diagram 300 illustrates how alerts from different regions may be addressed by a system according to embodiments. According to an example scenario, Monitoring engines 303, 313, and 323 may be responsible for monitoring hardware and/or software problems from regions 1, 2, and 3 (304, 314, and 324), respectively. Upon detecting a problem, each of the monitoring engines may transmit alerts to respective automation engines 302, 312, and 322, which may be responsible for the respective regions. The logic for the automation engines may be distributed to each region in the same way the monitoring logic is. According to some embodiments, automation may occur cross-region such as a full site failure and recovery. According to other embodiments, an automation engine may be responsible for a number of regions. Similarly, the escalation target may also be centralized or distributed. For example, the system may escalate to different teams based on the time of day. Monitoring engines 303, 313, and 323 may have their own separate regional databases to manage monitoring processes. Automation engines 302, 312, and 322 may query the troubleshoot database (central or distributed) to map alerts to repair actions.

If corresponding repair action(s) are found, the automation engines 302, 312, and 322 may execute the repair action(s) on the devices and/or programs in regions 304, 314, and 324. A global monitoring database 310 may also be implemented for all regions. If the automation engines 302, 312, and 322 are unable to find matching repair actions, they may escalate the alerts to a designated support team 301 based on predefined regional priorities such as organizational structure. For example, region 304 may be the corporate enterprise network for a business organization while region 324 is the documentation support network. A problem detected in region 304, in this scenario, may be prioritized over a problem detected in region 324. Similarly, a time of day or work day/holiday distinction between the different regions, and comparable factors may be taken into consideration when determining regional priorities.

According to some embodiments, multiple automation engines may be assigned to different regions and the escalation and/or execution of repair action priorities decided through a consensus algorithm between the automation engines as mentioned above. Alternatively, a process overseeing the regional automation engines may render the priority decisions. Furthermore, automation engines 302, 312, and 322 may interact with regional troubleshoot databases, which include customized repair action—alert mappings for the distinct regions.

While automation of recovery and escalation processes in distributed systems have been discussed above using example scenarios, execution of specific repair actions and escalation of alerts in conjunction with FIGS. 1, 2, and 3, embodiments are not limited to those. Mapping of alerts to repair actions, prioritization of repair actions, escalation of alerts, and other processes may be implemented employing other operations, priorities, evaluations, and so on, using the principles discussed herein.

Figure 4:
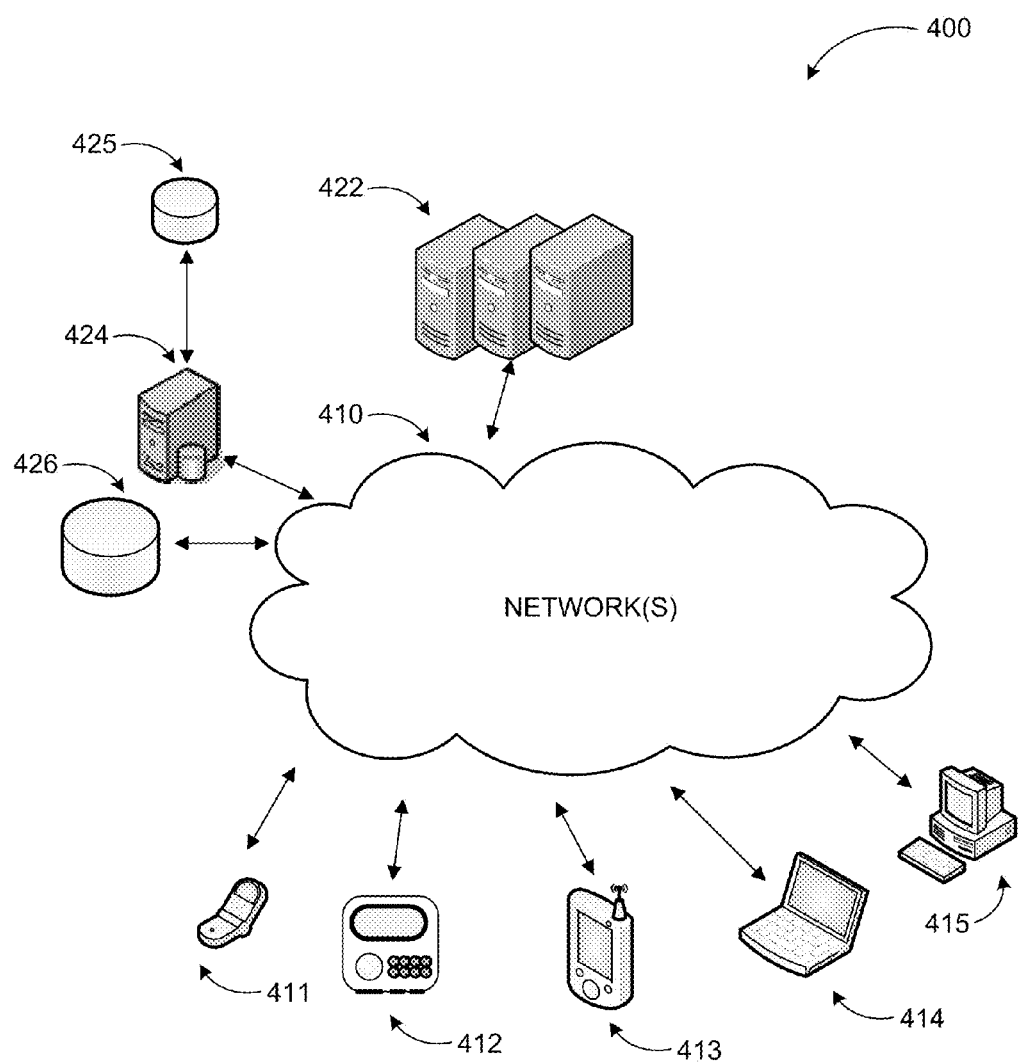
FIG. 4 is a networked environment, where a system according to embodiments may be implemented.

FIG. 4 is an example networked environment, where embodiments may be implemented. Mapping of an alert to a repair action may be implemented via software executed over one or more servers 422 such as a hosted service. The server 422 may communicate with client applications on individual computing devices such as a cell phone 411, a mobile computing device 412, a smart phone 413, a laptop computer 414, and desktop computer 415 (client devices) through network(s) 410. Client applications on client devices 411-415 may facilitate user interactions with the service executed on server(s) 422 enabling automated management of software and/or hardware problems associated with the service. Automation and monitoring engine(s) may be executed on any one of the servers 422.

Data associated with the operations such mapping the alert to the repair action may be stored in one or more data stores (e.g. data store 425 or 426), which may be managed by any one of the server(s) 422 or by database server 424. Automating recovery and escalation of detected problems according to embodiments may be triggered when an alert is detected by the monitoring engine as discussed in the above examples.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a system for automating management of distributed system problems according to embodiments. Furthermore, the networked environments discussed in FIG. 4 are for illustration purposes only. Embodiments are not limited to the example applications, modules, or processes.

Figure 5:
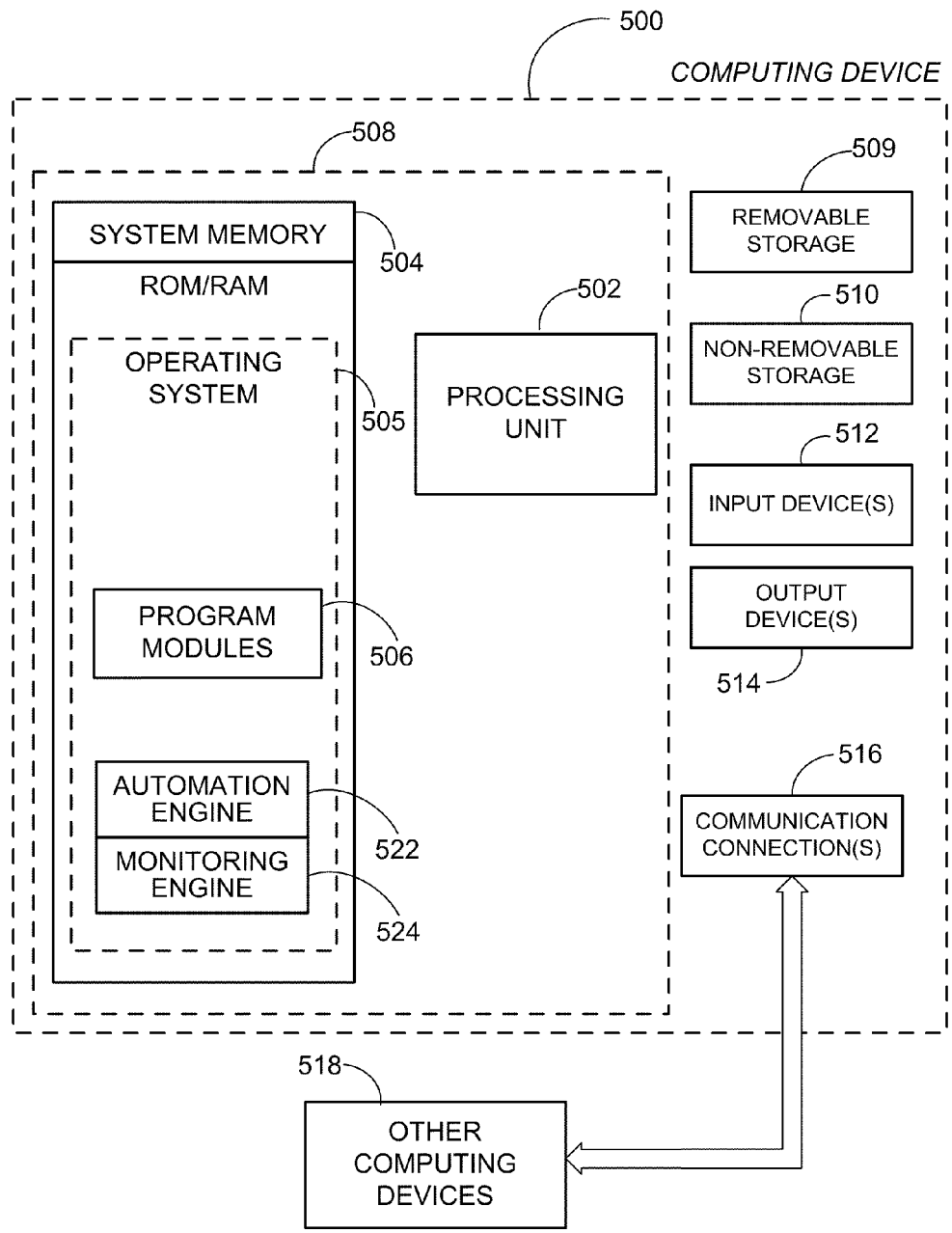
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for a service application according to embodiments is illustrated, such as computing device 500. In a basic configuration, computing device 500 may be a server in a hosted service system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more program modules 506, automation engine 522, and monitoring engine 524.

Automation and monitoring engines 522 and 524 may be separate applications or integral modules of a hosted service that handles system alerts as discussed above. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute distributed applications, and perform comparable operations. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
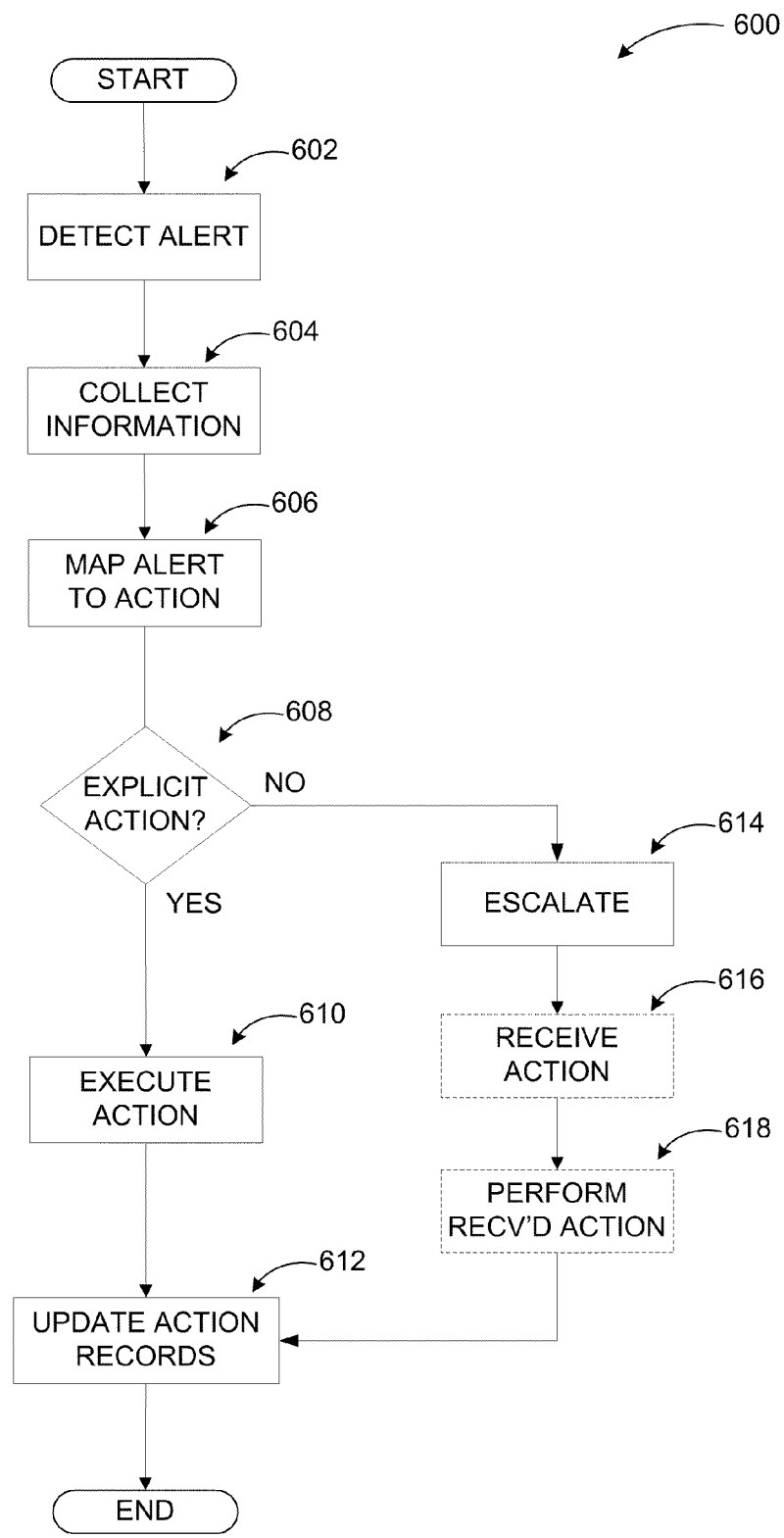
FIG. 6 illustrates a logic flow diagram for automated management of alerts in a networked communication environment according to embodiments.

FIG. 6 illustrates a logic flow diagram 600 for automating management of a problem recovery and escalation in distributed systems according to embodiments. Process 600 may be implemented at a server as part of a hosted service or at a client application for interacting with a service such as the ones described previously.

Process 600 begins with operation 602, where an automation engine detects an alert sent by a monitoring engine in response to a device and/or software application problem within the system. At operation 604, the automation engine having received the alert from the monitoring engine, may begin collecting information associated with the alert. This may be followed by attempting to map the alert to one or more repair actions at operation 606.

If an explicit action mapped to the alert is found at decision operation 608, the action (or actions) may be executed at subsequent operation 610. If no explicit action is determined during the mapping process, the alert may be escalated to a designated person or team at operation 614. Operation 614 may be followed by optional operations 616 and 618, where a new action may be received from the designated person or team and performed. At operation 612, records may be updated with the performed action (mapped or new) such that the mapping database can be expanded or statistical information associated with success rates may be used for future monitoring and automated response tasks.

The operations included in process 600 are for illustration purposes. Automating recovery and escalation of problems in complex distributed applications may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for automated recovery and escalation of alerts in distributed systems, the method comprising:
   receiving an alert associated with a detected problem from a monitoring engine;

performing a wild card search of an action store to determine recovery actions mapped to the alert;

attempting to map the alert to one of the recovery actions by applying the recover action having a specificity associated with the alert;

updating schedules of plurality of designees associated with the alert from at least one of: an integrated and an external scheduling system;

determining a designee from the plurality to send the alert based on an updated schedule of the designee identifying the designee as on call;

if the alert is mapped to the recovery action from the action store, performing the recovery action according to a predetermined priority of recovery actions;

else escalating the alert to the designee to perform a new action; and updating records with the new action associated with alert-recovery action mapping and maintaining a log of the designee who performed the new action, a time when the new action was performed and a device or server on which the new action was performed.

2. The method of claim 1, further comprising:
collecting diagnostic information associated with the detected problem;
providing the collected diagnostic information to the designee if the alert is escalated; and
employing the collected diagnostic information in updating the records.

3. The method of claim 2, wherein the collected diagnostic information includes at least one from a set of: memory contents of a device, sensor readings, last executed instructions, failed instructions, and failure results associated with the detected problem.

4. The method of claim 1, further comprising:
waiting for a hand-off response from the designee after escalating the alert; and
if the hand-off response is not received within a predefined period, escalating the alert to another designee.

5. The method of claim 1, wherein the designee is determined from one of a predefined list of the designees and a naming convention of the alert, and the designee includes one of a person and a team.

6. The method of claim 1, wherein a team member to receive the alert within a designated team is determined based on one of a rotational algorithm and a scheduling information for the designated team.

7. The method of claim 1, wherein the recovery action is selected from a plurality of actions that are one of predefined and automatically generated based on a recovery action success evaluation scheme.

8. The method of claim 1, wherein escalating the alert includes:
transmitting the alert to the designee by at least one from a set of: an email, an instant message, a text message, a page, and a voicemail.

9. The method of claim 1, further comprising:
gathering additional diagnostic information; and
re-attempting to map the alert to the recovery based on the additional diagnostic.

10. The method of claim 1, further comprising:
receiving a feedback action from one of a device and a program associated with the detected problem upon the execution of the recovery action; and
updating a success ratio record associated with the recovery action.

11. A system for automated recovery and escalation of alerts in distributed systems, the system comprising:

a server executing a monitoring engine and an automation engine, wherein the monitoring engine is configured to:
monitor processes associated with at least one of a device and a software application of a distributed system in a separate regional database associated with a plurality of distinct geographic regions;
detect a problem associated with the at least one device and software application within a distinct geographic region of a distributed system; and
transmit an alert based on the detected problem; and the automation engine is configured to:
receive the alert;
collect diagnostic information associated with the detected problem;
attempt to map the alert to a recovery action employing a recovery action database;
interact with a regional troubleshoot database including customized repair actions to map the alert to one of the customized repair actions to customize the recovery action;
if the alert is mapped to a recovery action, perform the recovery action; else
escalate the alert to a designee along with the collected diagnostic information;
update records in the recovery action database to maintain a log of the designee who performed the new action, a time when the new action was performed and a device or server on which the new action was performed; and
employ a learning algorithm to expand an actions list hosting the recovery action within the recovery action database, to map new alerts to existing actions in the actions list, and to map a new alert to the new action.

12. The system of claim 11, further comprising a plurality of monitoring engines, each monitoring engine configured to monitor each distinct geographic region based on system scale for each geographic region within the distributed system and transmit alerts based on problems detected in their respective regions, wherein the automation engine is further configured to:
one of perform a mapped recovery action and escalate to the designee alerts from different regions based on a regional priority.

13. The system of claim 12, wherein the regional priority includes at least one from a set of: a predefined priority, a time of day, a workday, a holiday, and an organizational structure associated with each region.

14. The system of claim 13, wherein the regional priority is further determined based on availability of at least one from a set of: a designated support team, a hardware resource, a software resource, and a communication resource.

15. The system of claim 11, wherein the alert is mapped to a plurality of recovery actions, and the recovery actions are executed according to a predefined execution priority.

16. The system of claim 15, wherein the execution priority is adjusted based on a recorded success ratio of recovery actions.

17. The system of claim 11, wherein the device includes one of: a desktop computer, a laptop computer, a handheld computer, a server, a smart phone, a monitor, audio equipment, a television set, and a video capturing device.

18. A method to be executed on a computing device for automated recovery and escalation of alerts in distributed systems, the method comprising:
detecting a problem associated with at least one of a device and a software application within a distributed system at a monitoring engine;

transmitting an alert based on the detected problem from the monitoring engine; and
receiving the alert at an automation engine of multiple automation engines, each automation engine assigned to a different region;
collecting diagnostic information associated with the detected problem;
performing a wild card search of a recovery action database to determine recovery actions mapped to the alert;
attempting to map the alert to one of the recovery actions from the recovery action database by applying the recover action having a specificity associated with the alert, the recovery action including a set of instructions on addressing the detected problem;
interacting with a regional troubleshoot database including customized repair actions to map the alert to one of the customized repair actions to customize the recovery action;
updating schedules of plurality of designees associated with the alert from at least one of: an integrated and an external scheduling system;
determining a designee from the plurality to send the alert based on an updated schedule of the designee identifying the designee as on call;
if the alert is mapped to a single recovery action, performing the recovery action;
if the alert is mapped to a plurality of recovery actions, performing the recovery actions at one of the multiple automation engines according to a predefined execution priority, wherein the predefined execution priority of recovery actions is described through a consensus algorithm between the multiple automation engines;
if the alert is not mapped to a recovery action, escalating the alert to the designee along with the collected diagnostic information;
receiving a hand-off response from the designee;
updating records in the recovery action database employing the collected diagnostic information and a feedback response associated with the performed recovery actions to expand the recovery action database with statistical information associated with success rates to be used for future monitoring and automated response tasks; and
employing a learning algorithm to expand an actions list hosting the recovery action within the recovery action database, to map new alerts to existing actions in the actions list, and to map a new alert to the new action.

19. The method of claim 18, wherein the recovery action is mapped to one of: a single alert and a group of alerts.

20. The method of claim 18, wherein the designee is determined from one of a naming convention of the alert and a rotational algorithm based on availability of support personnel.

* * * * *